(12) United States Patent
Kim et al.

(10) Patent No.: US 10,068,315 B2
(45) Date of Patent: Sep. 4, 2018

(54) ELECTRONIC DEVICE AND METHOD FOR OPERATING DISPLAY

(71) Applicant: Samsung Electronics Co., Ltd., Suwon-si, Gyeonggi-do (KR)

(72) Inventors: Ha Young Kim, Ansan-si (KR); Soo Jung Bae, Seoul (KR); Min Hee Lee, Seoul (KR); Ho Young Lee, Seoul (KR); Hye Ryoung Choi, Gwangmyeong-si (KR); Hui Chul Yang, Yongin-si (KR); Chul Ho Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/721,330

(22) Filed: May 26, 2015

(65) Prior Publication Data
US 2015/0339804 A1  Nov. 26, 2015

(30) Foreign Application Priority Data
May 26, 2014  (KR) .................. 10-2014-0062863

(51) Int. Cl.
*G06T 3/60* (2006.01)
*G06F 3/0488* (2013.01)

(52) U.S. Cl.
CPC ............ *G06T 3/60* (2013.01); *G06F 3/04886* (2013.01); *G06F 2200/1614* (2013.01); *G06F 2203/04802* (2013.01)

(58) Field of Classification Search
None
See application file for complete search history.

(56) References Cited

U.S. PATENT DOCUMENTS

| | | | |
|---|---|---|---|
| 8,421,825 B2 | 4/2013 | Taniguchi et al. | |
| 8,850,480 B2* | 9/2014 | Chane | ............................ 725/24 |
| 2008/0074442 A1 | 3/2008 | Taniguchi et al. | |
| 2010/0023895 A1* | 1/2010 | Benko | ..................... G06F 3/041 715/863 |
| 2011/0163969 A1* | 7/2011 | Anzures | .............. G06F 3/04883 345/173 |
| 2012/0274575 A1* | 11/2012 | Solomon | ............... G06F 1/1601 345/173 |
| 2013/0002568 A1* | 1/2013 | Selim | .................... G06F 1/1616 345/173 |
| 2013/0038759 A1* | 2/2013 | Jo | ........................ H04N 5/2256 348/240.99 |
| 2013/0271447 A1* | 10/2013 | Setlur | ................... G06F 1/1626 345/418 |
| 2013/0300697 A1 | 11/2013 | Kim et al. | |
| 2014/0089833 A1* | 3/2014 | Hwang | ............... G06F 3/04817 715/769 |

(Continued)

*Primary Examiner* — Yu Chen
(74) *Attorney, Agent, or Firm* — Jefferson IP Law, LLP

(57) ABSTRACT

A display operating electronic device is provided. The display operating electronic device includes a display configured to include a first output area and a second output area, a sensor module configured to detect whether the display rotates, and a processor configured to output an execution screen in the first output area and output at least one item in the second output area, and configured to replace the at least one item with at least one new item in the second output area if a pre-defined amount of rotation is detected.

18 Claims, 9 Drawing Sheets

(56) References Cited

U.S. PATENT DOCUMENTS

| | | | |
|---|---|---|---|
| 2014/0267091 A1* | 9/2014 | Kim | G06F 1/1652 |
| | | | 345/173 |
| 2014/0359520 A1* | 12/2014 | Cerny | G06F 9/4443 |
| | | | 715/781 |
| 2014/0372889 A1 | 12/2014 | Anzures et al. | |
| 2015/0095826 A1* | 4/2015 | Ahn | G06F 3/0488 |
| | | | 715/769 |
| 2015/0154730 A1* | 6/2015 | Hirakata | G06T 1/20 |
| | | | 345/520 |
| 2015/0242006 A1 | 8/2015 | Kim et al. | |
| 2015/0261376 A1* | 9/2015 | Kim | G06F 3/0487 |
| | | | 345/173 |
| 2015/0338988 A1* | 11/2015 | Lee | G06F 1/1613 |
| | | | 345/173 |
| 2016/0041680 A1* | 2/2016 | Chi | H04B 1/385 |
| | | | 345/173 |

* cited by examiner

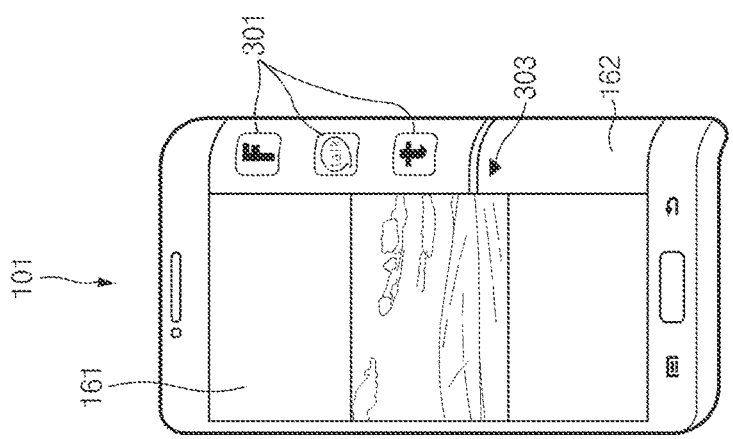
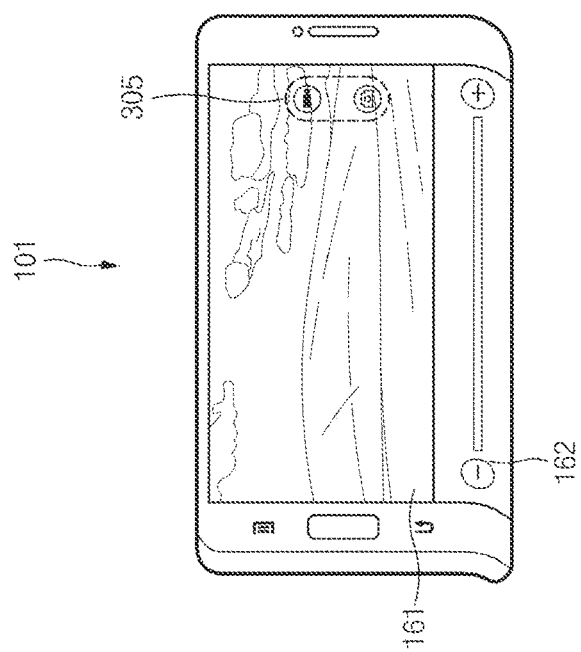
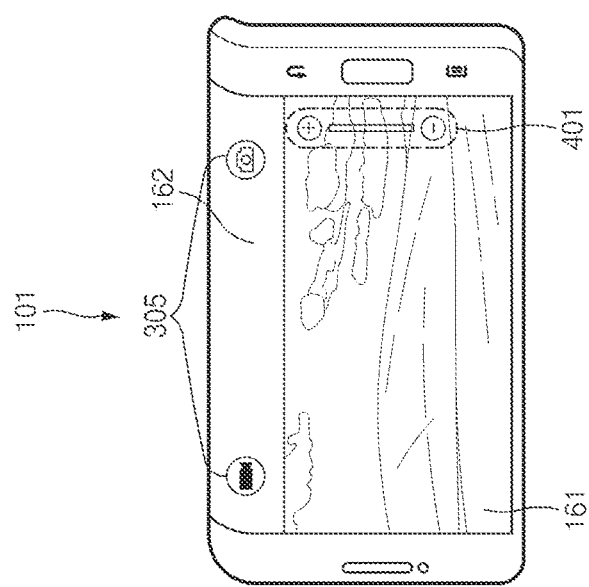
Fig. 4C
Fig. 4B
Fig. 4A

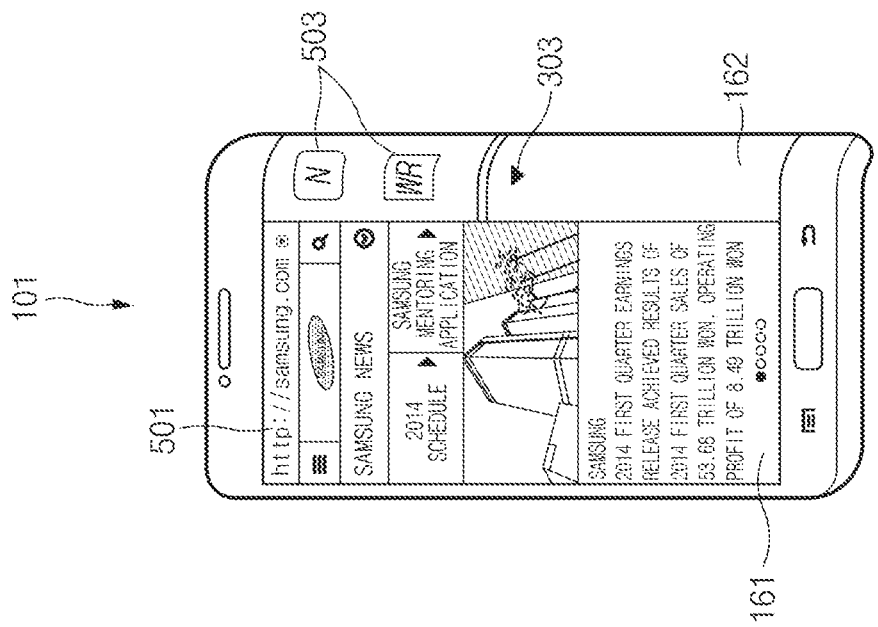
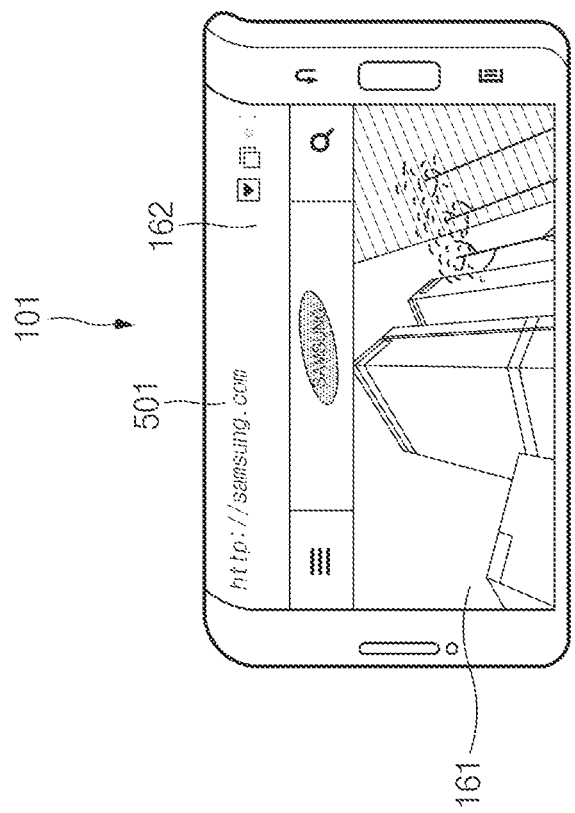
Fig. 5B
Fig. 5A

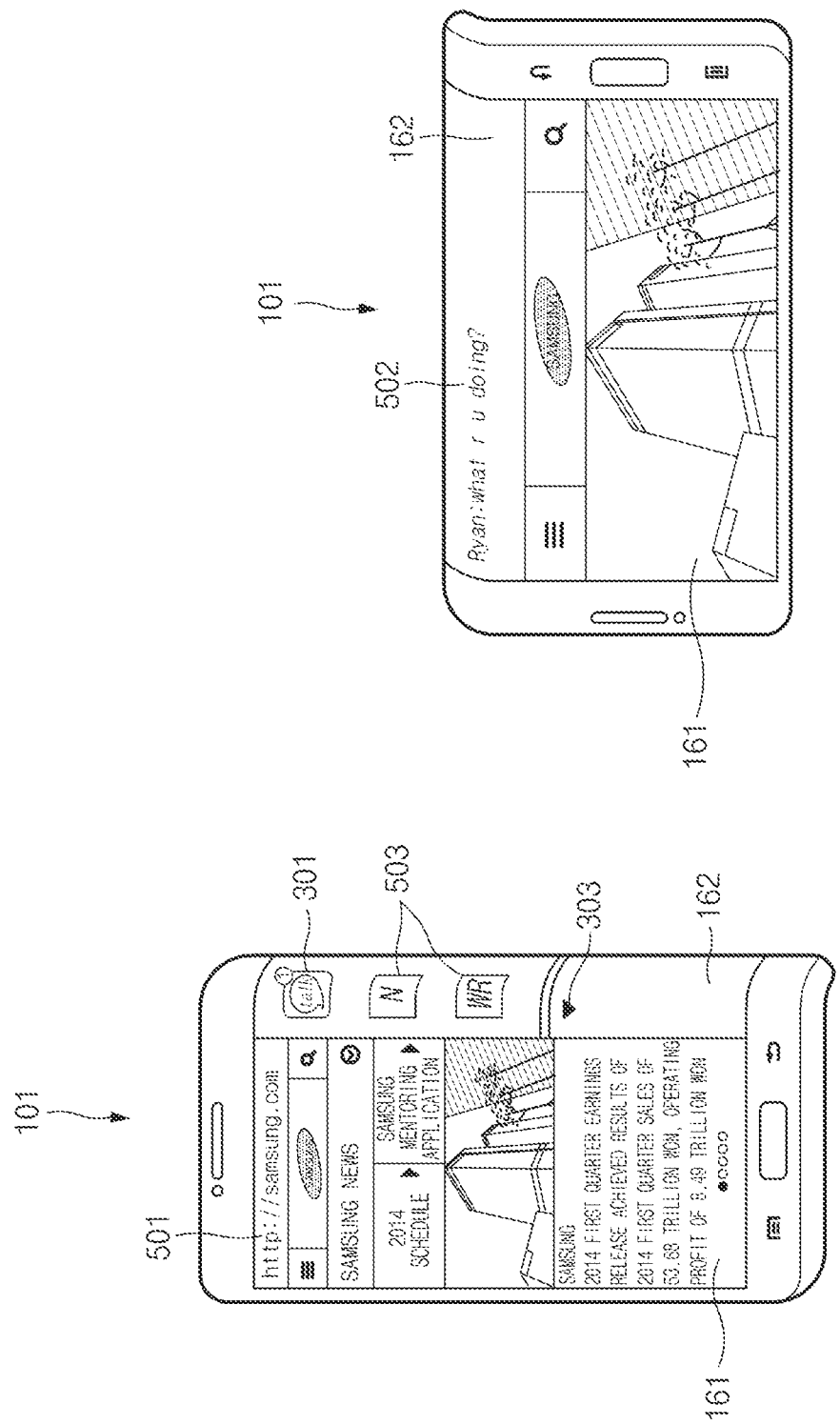

ELECTRONIC DEVICE AND METHOD FOR OPERATING DISPLAY

CROSS-REFERENCE TO RELATED APPLICATION(S)

This application claims the benefit under 35 U.S.C. § 119(a) of a Korean patent application filed on May 26, 2014 and assigned Serial number 10-2014-0062863, the entire disclosure of which is hereby incorporated by reference.

TECHNICAL FIELD

The present disclosure relates to a display operating electronic device and method for controlling an output of a display.

BACKGROUND

Electronic devices, which have become a necessity of modern society through the development of telecommunications industry, have become an important means of rapidly changing information transmission.

The electronic devices may perform various functions, for example, voice communication, data communication, video recording, voice storage, music file playback, and games. The electronic devices may have various menus for performing the above-mentioned various functions.

In relation to the above typical electronic devices, due to various menus, a user may become confused on how to manipulate the electronic devices. Additionally, since the typical electronic device provides only the rotation of image data outputted to a display according to the rotation of the electronic device by using one display, it is difficult to provide a user interface optimized for the orientation of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display operating electronic device and method for dividing one display equipped in an electronic device into a plurality of displays and outputting various items in a predetermined area of the divided display.

Another aspect of the present disclosure is to provide a display operating electronic device and method for dividing one display equipped in an electronic device into a plurality of output areas and controlling an output of a first output area and a second output area according to a rotation of the display.

In accordance with an aspect of the present disclosure, a display operating electronic device is provided. The display operating electronic device includes a display configured to include a first output area and a second output area, a sensor module configured to detect whether the display rotates, and a processor configured to output an execution screen in the first output area and output at least one item in the second output area, and configured to replace the at least one item with at least one new item in the second output area if a pre-defined amount of rotation is detected.

In accordance with another embodiment of the present disclosure, a display operating method is provided. The display operating method includes outputting an execution screen in a first output area of a display and outputting at least one item in a second output area, and outputting, when it is confirmed that the display rotates, at least one new item in the second output area.

In accordance with another embodiment of the present disclosure, an electronic device is provided. The electronic device includes a display configured to include a main area and a sub-area, one side of the main area meeting one side of the sub-area, a sensor configured to detect a rotation angle of the electronic device, and a processor configured to output a main screen to the main area and a sub-screen to the sub-area, and to change the sub-screen based on the rotation angle of the electronic device.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 4C are screen views illustrating a display operating method during a camera operation according to another embodiment of the present disclosure.

FIGS. 5A and 5B are screen views illustrating a display operating method when checking a webpage according to an embodiment of the present disclosure.

FIGS. 6A and 6B are screen views illustrating a display operating method when receiving a message according to an embodiment of the present disclosure.

Throughout the drawings, it should be noted that like reference numbers are used to depict the same or similar elements, features, and structures.

DETAILED DESCRIPTION

Figure 1:
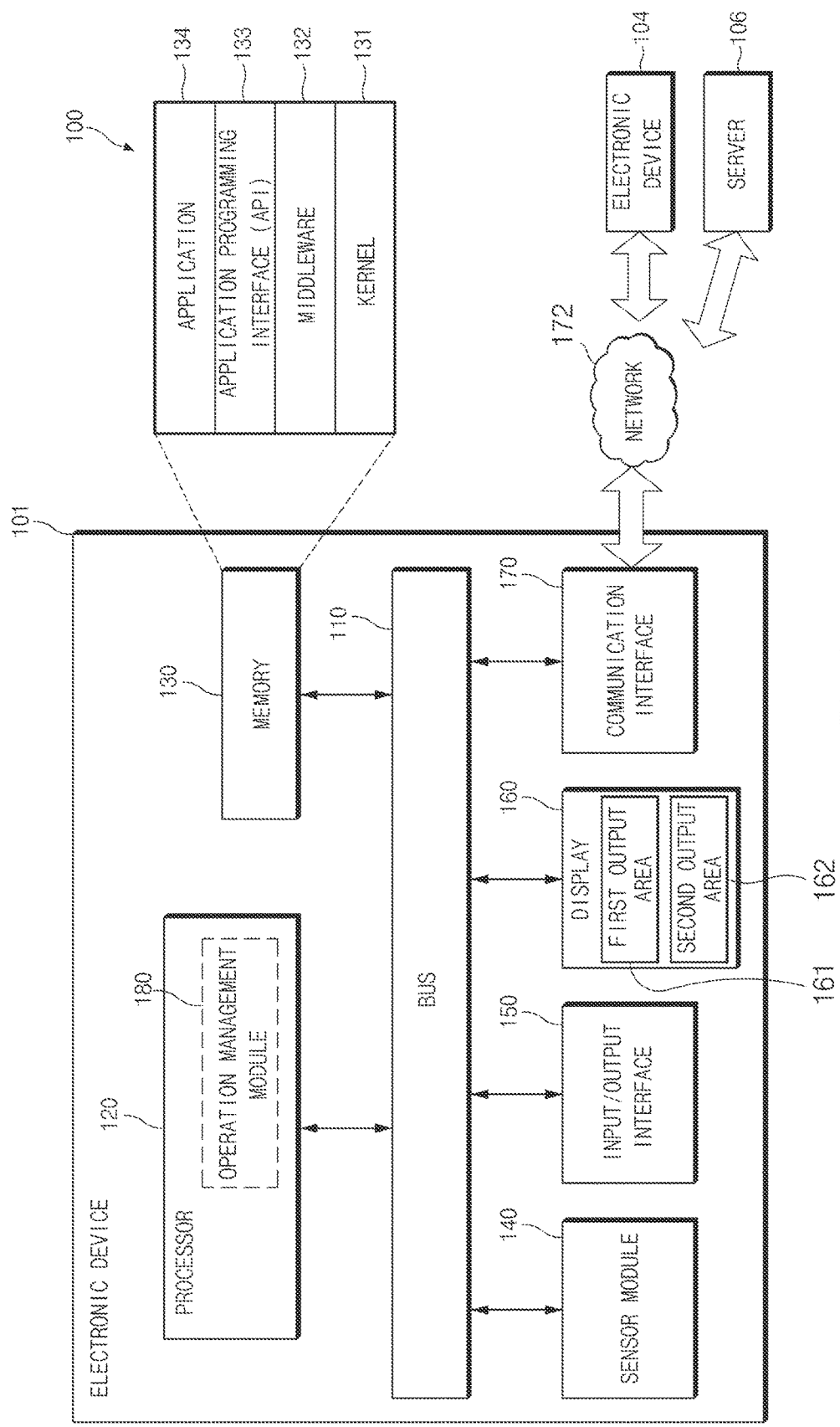
FIG. 1 is a block diagram illustrating a main component of a display operating electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The meaning of the term "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For instance, without departing from the scope of various embodiments of the present disclosure, a first element may be named as a second element, and similarly, a second element may be named as a first element.

It will be understood that when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present.

The terminology used herein is not for delimiting various embodiments of the present disclosure but for only describing specific embodiments. The terms of a singular form may include plural forms unless otherwise specified.

Otherwise defined, the terms used herein, including technical or scientific terms, have the same meanings as generally understood by those skilled in the art. It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to various embodiments of the present disclosure may have the communication function. For instance, electronic devices may include at least one of smartphones, tablet Personal Computers (PCs), mobile phones, video phones, electronic book (e-book) readers, MP3 players, mobile medical devices, cameras, and wearable devices Hereinafter, an electronic device according to various embodiments of the present disclosure will be described in more detail with reference to the accompanying drawings.

The term "user" in various embodiments may refer to a person using an electronic device or a device using an electronic device (e.g., an artificial intelligent electronic device).

FIG. 1 is a block diagram illustrating a main component of a display operating electronic device according to an embodiment of the present disclosure.

Referring to FIG. 1, the display operating electronic device 101 (hereinafter, referred to as an electronic device 101) in a network environment 100 may include a bus 110, a processor 120, a memory 130, a sensor module 140, an input/output interface 150, a display 160, and a communication interface 170, but is not limited thereto. The processor 120 may comprise an operation management module 180. The display 160 may include a first output area 161 and a second output area 162. The electronic device 101 may output an execution screen in the first output area 161 and may output at least one item in the second output area 162. Once a rotation of the display 160 is detected, the electronic device 101 may replace the at least one item and/or output at least one new item in the second output area 162.

The bus 110 may be a circuit connecting the above-mentioned components to each other and delivering a communication (e.g., a control message) therebetween.

The processor 120 receives an instruction from the above other components (e.g., the memory 130, the sensor module 140, the input/output interface 150, the display 160, or the communication interface 170) through the bus 110, interprets the received instruction, and performs operations and data processing in response to the interpreted instruction. In some implementations, the processor 120 and the operation management module 180 may be embodied in one chip such as a System on Chip (SoC), AP, or an arbitrary processor, and the SoC (i.e., the one chip) may be referred as a "processor." In other implementations, the processor 120 may perform the function or operation described in this document, which may be performed by the operation management module 180. In various embodiments, the operation management module 180 may correspond to the processor 120 itself, or may correspond to a processing unit included in the SoC or the AP. For example, an AP such as a Snapdragon®, the AP may contain an embedded CPU, GPU, Digital Signal Processor (DSP), audio/video decoders, wireless hardware, and modem for cellular communication. In this example, the operation management module 180 may correspond to the AP or any processing unit such as CPU or GPU included in the AP, which can perform the functions disclosed herein. Further, in some embodiments, the operation management module 180 may correspond to a software module embodied by that the processor 120 executes instructions which are stored in the memory and correspond to the functions disclosed herein. In this disclosure, the operation management module 180 may be understood as the processor 120, or vice versa.

The memory 130 may store an instruction or data received from the processor 120 or other components (e.g., the sensor module 140, the input/output interface 150, the display 160, the communication interface 170, or the operation management module 180) or an instruction or data generated from the processor 120 or other components. The memory 130 may include programming modules, for example, a kernel 131, a middleware 132, an Application Programming Interface (API) 133, and an application 134. Each of the above-mentioned programming modules may be configured with software, firmware, hardware, or a combination thereof The memory 130 may store an application received from an external device and installed and may store an app icon of the application. The memory 130 may also store a symbol icon indicating a particular web site (i.e., a shortcut for the URL of the web site). Some icons of the app icons and the symbol icons may be set as a favorite, for example, by a user.

The sensor module 140 may detect an operational state of the electronic device 101 and may then convert the detected information into electrical signals. The sensor module 140 may provide the converted electrical signals to the processor 120. The sensor module 140 may correspond to a gyro sensor or a gravity sensor which can detect the rotation of the electronic device 101.

The input/output interface 150 may deliver an instruction or data inputted from a user through an input/output device (e.g., a sensor, a keyboard, or a touch screen), to the processor 120, the memory 130, or the communication interface 170 through the bus 110. For example, the input/output interface 150 may provide data on a user's touch inputted through a touch screen to the processor 120. Additionally, the input/output interface 150 may output an instruction or data received from the processor 120, the memory 130, or the communication interface 170 through the bus 110, through the input/output device (e.g., a speaker or a display).

The display 160 may provide various information to a user. For example, the display 160 may display various screens operating according to a control of the operation management module 180 (or processor 120). The display 160 may include a Liquid Crystal Display (LCD) and a touch screen. When at least a portion of the display 160 is a flexible display, a bending (or curved) area of the display 160 may be referred to as a second output area 162 and the remaining area may be referred to as a first output area 161. When the display 160 is not a flexible display, a predetermined area of the display 160 may be referred to as a second output area 162 and the remaining area may be referred to as a first output area 161.

According to an embodiment of the present disclosure, the display 160 may display an execution screen for a function currently executed in the entire first output area 161 and second output area 162. The display 160 may rotate the execution screen depending on a rotation direction according to a control of the operation management module 180 as the electronic device 101 rotates and may convert the execution screen to be fit for the size of the first output area 161 and may then output the execution screen in the first output area 161. According to a control of the operation management module 180, the display 160 may output an item such as an icon, a menu, or a text in the second output area 162. At this point, the icon may be an attribute control icon relating to a specific function providing an execution screen, an app icon relating to an application, a symbol icon relating to a website, or a state icon relating to an indicator. The menu may include a menu for performing zoom adjustment of image data and volume adjustment of sound data. The text may include a text including a notification message for an operation of a pre-installed application and a web URL address. The position of the second output area 162 may be one of up, down, left or right of the first output area 161. For example, the right side of the first output area 161 may meet the left side of the second output area 162. Further, the size of the first output area 161 (e.g., a main area) is much bigger than the size of the second output area 162 (e.g., a sub area, a menu area, or a control area, and the like).

According to an embodiment of the present disclosure, the display 160 may display an execution screen for a function currently executed in the first output area 161 according to a control of the operation management module 180. The display 160 may output at least one item in the second output area 162 according to the position of the second output area 162. According to a control of the operation management module 180, the display 160 may output an execution screen converted based on a rotation direction of the display 160. According to a control of the operation management module 180, the display 160 may convert and output at least one item outputted in the second output area 162 according to a rotation of the display 160.

The communication interface 170 may connect a communication between the electronic device 101 and an external device (e.g., the electronic device 104 or the server 106). For example, the communication interface 170 may communicate with the external device in connection to the network 172 through wireless communication or wired communication.

The processor 120 may output an execution screen in the first output area 161 and may output at least one item in the second output area 162. Once a rotation detection of the display 160 is confirmed from the sensor module 140, the processor 120 may output at least one item in the second output area 162.

According to an embodiment of the present disclosure, the processor 120 may output an execution screen to the entire display 160 by using the first output area 161 and second output area 162 as one output area according to a type of application or a user's selection.

Once a rotation detection of the display 160 is confirmed from the sensor module 140, the operation management module 180 may confirm the rotation direction of the display 160. The operation management module 180 may rotate an execution screen outputted to the display 160 according to the confirmed rotation direction. The operation management module 180 may convert the size of an execution screen according to the size of the first output area 161 and may then output the execution screen to the first output area 161.

The operation management module 180 may output at least one item in the second output area 162 on the basis of the position of the second output area 162. Once a rotation is detected, if the rotation is confirmed that the second output area 162 is positioned at the left or right of the first output area 161, the operation management module 180 may output at least one icon in the second output area 162. At this point, the icon may include an attribute control icon relating to a function corresponding to an execution screen, a state icon relating to an indicator, an app icon relating to a function corresponding to an execution screen, an app icon or symbol icon preset to a favorite by a user, and an app icon for performing a function similar or identical to that of an application corresponding to an execution screen. The operation management module 180 may confirm a profile of an executing application and may confirm another application has the same profile as the executing application among pre-installed applications. The profile may be registration information that is set by a developer when an application is registered in a server such as an app store.

When a rotation of the display 160 is detected, the operation management module 180 may confirm the positions of the second output area 162 and the first output area 161. If the rotation is confirmed that the second output area 162 is positioned above or below the first output area 161, the operation management module 180 may output one of a progress display menu (e.g., a playback progress bar) or text in the second output area 162. The text may include a notification message for an operation of a pre-stored application and a web URL address.

According to an embodiment of the present disclosure, the operation management module 180 may output an execution screen in the first output area 161 according to a type of application or a user's selection. The operation management module 180 may output an item such as an icon, a menu, or a text in the second output area 162.

Once a rotation detection of the display 160 is confirmed from the sensor module 140, the operation management module 180 may confirm the rotation direction of the display 160. The operation management module 180 may rotate an execution screen outputted to the first output area 161 according to the confirmed rotation direction and may then output the execution screen. The operation management module 180 may change at least one item outputted to the second output area 162 and may then output the at least one item.

The operation management module 180 may confirm the positions of the second output area 162 according to a rotation direction. The operation management module 180 may change at least one item outputted to the second output area 162 according to the confirmed position of the second output area 162 and may then output the at least one item.

If the second output area 162 is positioned above or below the first output area 161 on the basis of a user, the operation management module 180 may output one item among a progress display menu or text in the second output area 162. The operation management module 180 may detect a rotation of the display 160 while one item among a progress display menu or a text is outputted in the second output area 162. When a rotation of the display 160 is detected, the operation management module 180 may change the shape and form of the item and may then arrange the item at an arbitrary position. Once the rotation of the display 160 is detected, the operation management module 180 may output at least one icon in the second output area 162.

When the second output area 162 is positioned at the left or right of the first output area 161, the operation management module 180 may output at least one icon in the second output area 162. The operation management module 180 may detect a rotation of the display 160 while at least one icon is outputted in the second output area 162. Once a rotation of the display 160 is detected, the operation management module 180 may output one of a progress display menu or a text in the second output area 162.

In this embodiment, there are one operation management module 180 and one display 160 but the present disclosure is not limited thereto.

According to an embodiment of the present disclosure, an electronic device may include a first output area and second output area and may include a processor controlling a plurality of output areas. Upon the receipt of a selection signal for an application having a specific function through an input/output interface, the processor may execute an application corresponding to the selection signal. The processor may output an execution screen for an application in a first output area and a second output area. The processor may confirm the pixels of the first output area and the pixels of the second output area and may then divide an execution screen according to the confirmed pixels. The processor may output part of the divided execution screen in the first output area and may output another part of the divided execution screen in the second output area.

Once a rotation of a display occurs, the processor may rotate the execution screen outputted in the first output area and the second output area to correspond to the rotation direction. The processor may convert the execution screen to be fit for the size of the first output area and may then output the execution screen in the first output area. The processor may confirm the position of the second output area according to the rotation direction of the display and may output at least one item in the second output area.

Additionally, the processor may execute an application corresponding to a selection signal. The processor may output an execution screen for an application in the first output area and may output at least one item in the second output area.

Once a rotation of the display occurs, the processor may rotate the execution screen outputted in the first output area to correspond to the rotation direction. The processor may convert the execution screen to be fit for the size of the first output area and may then output the execution screen in the first output area. The processor may confirm the position of the second output area according to the rotation direction of the display and may change and output at least one item in the second output area.

According to an embodiment of the present disclosure, an electronic device may include an additional first output area and second output area and may include a first processor controlling the first output area and a second processor controlling the second output area.

Upon the receipt of a selection signal for an application having a specific function through an input/output interface, the first processor may execute an application corresponding to the selection signal. The first processor may output an execution screen in the first output area. The second processor may output at least one item in the second output area.

Once a rotation of a display occurs, the first processor may rotate the execution screen outputted in the first output area to correspond to the rotation direction. The first processor may convert the execution screen to be fit for the size of the first output area and may then output the execution screen in the first output area. The processor module may confirm the position of the second output area according to the rotation direction of the display and may change and output at least one item in the second output area.

According to an embodiment of the present disclosure, the display operating electronic device 101 may include a display 160 including a first output area 161 and a second output area 162, a sensor module 140 detecting whether the display 160 rotates, and a processor 120 outputting an execution screen in the first output area 162 and outputting at least one item in the second output area 162 when at least one item is outputted in the second output area 162 and the rotation of the display 160 is confirmed.

When a rotation of the display 160 is confirmed, the processor 120 may rotate the execution screen according to the rotation direction and may then output the execution screen in the first output area 161.

Once the rotation of the display 160 is confirmed, the processor 120 may arrange at least one icon outputted in the second output area 162 in the first output area 161.

The processor 120 may output an execution screen and at least one item in the first output area 161. Once the rotation of the display 160 is confirmed, the processor 120 may interchange at least one item outputted in the output area 161 and at least one item outputted in the second output area 162.

Figure 2:
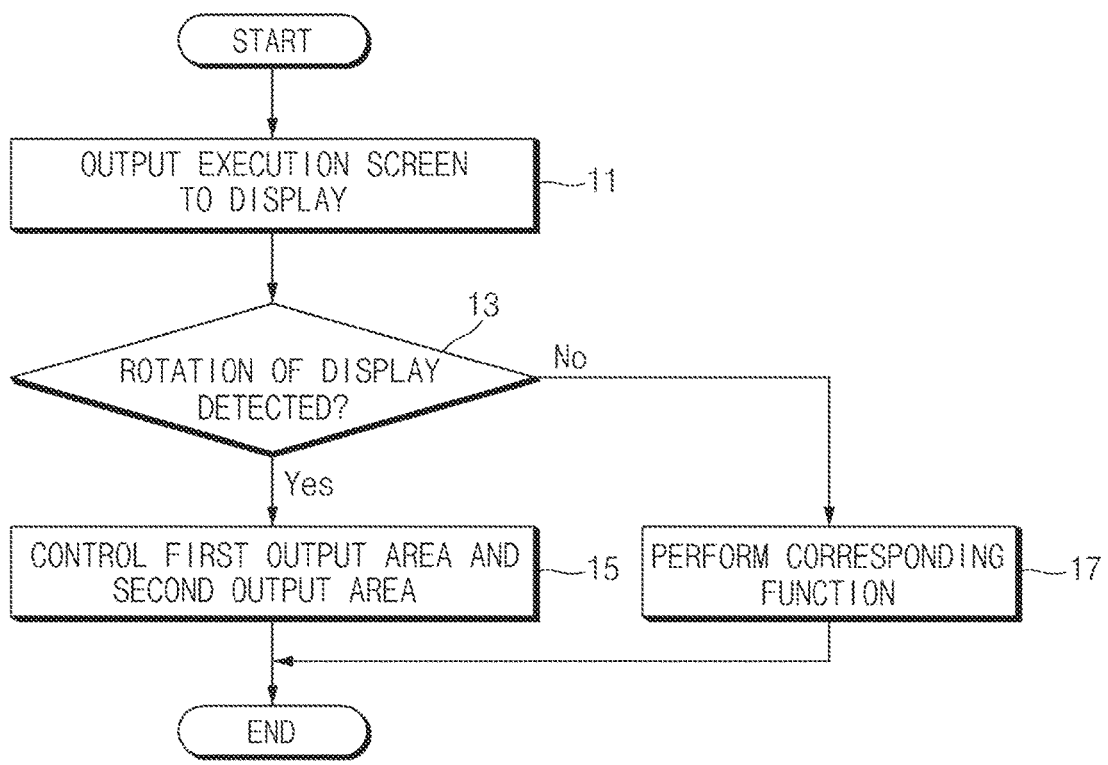
FIG. 2 is a flowchart illustrating a display operating method according to an embodiment of the present disclosure.

FIG. 2 is a flowchart illustrating a display operating method according to an embodiment of the present disclosure.

Referring to FIGS. 1 and 2, the operation management module 180 may output an execution screen for a function in execution to the display 160 in operation 11. According to an embodiment of the present disclosure, the operation management module 180 may output an execution screen in the first output area 161 and the second output area 162 of the display 160. According to an embodiment of the present disclosure, the operation management module 180 may output an execution screen in the first output area 161 of the display 160 and may output at least one item in the second output area 162 of the display 160.

In operation 13, the operation management module 180 may confirm whether the display 160 rotates according to a signal provided from the sensor module 140. According to the confirmation result in operation 13, when the rotation of the display 160 is confirmed, the operation management module 180 may perform operation 15. According to the confirmation result in operation 13, when the rotation of the display 160 is not confirmed, the operation management module 180 may perform operation 17. In operation 17, the operation management module 180 may perform a function in execution continuously.

In operation 15, the operation management module 180 may convert and output an execution screen outputted in the first output area 161 according to the rotation direction of the display 160. The operation management module 180 may confirm the positions of the second output area 162 according to a rotation direction of the display 160. The operation management module 180 may output at least one item in the second output area 162 by controlling the second output area 162.

According to an embodiment of the present disclosure, while the execution screen is outputted in the entire first and second output areas 161 and 162 of the display 160, if the rotation of the display 160 occurs, the operation management module 180 may confirm the rotation direction of the display 160. The operation management module 180 may convert the execution screen and may then output the execution screen in the first output area 161 and also may output at least one item in the second output area 162. The operation management module 180 may rotate the execution screen on the basis of the confirmed rotation direction and may convert the execution screen to be fit for the size of the first output area 161 to output the execution screen in the first output area 161.

The operation management module 180 may output at least one item in the second output area 162 according to the confirmed position of the second output area 162. The operation management module 180 may output a particular screen including, for example, at least one icon in the second output area 162 positioned at the left or right of the first output area 161. The operation management module 180 may output another screen different from the particular screen, which includes, for example, one of a progress display menu or a text in the second output area 162 disposed above or below the first output area 161.

According to an embodiment of the present disclosure, the operation management module 180 may output an execution screen in the first output area 161 of the display 160 and may output at least one item in the second output area 162. Once a rotation of the display 160 occurs, the operation management module 180 may confirm the rotation direction of the display 160. The operation management module 180 may rotate an execution screen outputted to the first output area 161 on the basis of the confirmed rotation direction and may then output the execution screen.

The operation management module 180 may change and output at least one item outputted in the second output area 162 depending on the position of the second output area 162 according to the rotation direction. If the second output area 162 is positioned above or below the first output area 161 on the basis of a user, the operation management module 180 may output one item among a progress display menu or text in the second output area 162. The operation management module 180 may detect a rotation of the display 160 while one item among a progress display menu or a text is outputted in the second output area 162. When a rotation of the display 160 is detected, the operation management module 180 may change the shape and form of the item and may then arrange the item at an arbitrary position. The operation management module 180 may detect a rotation of the display 160 while one item among a progress display menu or a text is outputted in the second output area 162. Once the rotation of the display 160 is detected, the operation management module 180 may output at least one icon in the second output area 162.

The operation management module 180 may change and output at least one item outputted in the second output area 162 depending on the position of the second output area 162 according to the rotation direction. When the second output area 162 is positioned at the left or right of the first output area 161, the operation management module 180 may output at least one icon in the second output area 162. If a rotation is detected while at least one icon is outputted in the second output area 162, the operation management module 180 may output one of a progress display menu or a text in the second output area 162.

According to an embodiment of the present disclosure, the display operating method may include outputting an execution screen in the first output area 161 of the display 160, outputting at least one item in the second output area 162, and outputting at least one new item in the second output area 162 when the rotation of the display 160 is confirmed.

The outputting of the at least one new item in the second output area 162 may further include, when the rotation of the display 160 is confirmed, rotating the execution screen according to the rotation direction of the display 160 and outputting the execution screen in the first output area 161.

The outputting of the at least one new item in the second output area 162 may further include, when the rotation of the display 160 is confirmed, arranging at least one item outputted in the second output area 162 in the first output area 161.

The outputting of the execution screen in the first output area 161 of the display 160 and the outputting of the at least one item in the second output area 162 may include outputting the execution screen and at least one item in the first output area 161 and outputting at least one item in the second output area 162. The outputting of the at least one new item in the second output area 162 may further include, when the rotation of the display 160 is confirmed, interchanging at least one item outputted in the first output area 161 and at least one item outputted in the second output area 162 and outputting them.

Figure 3C:
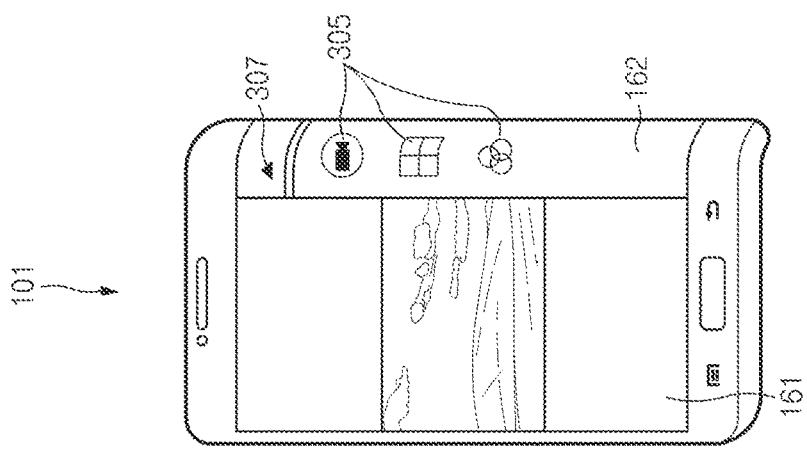
FIGS. 3A, 3B, and 3C are screen views illustrating a display operating method during a camera operation according to an embodiment of the present disclosure.
Figure 3B:
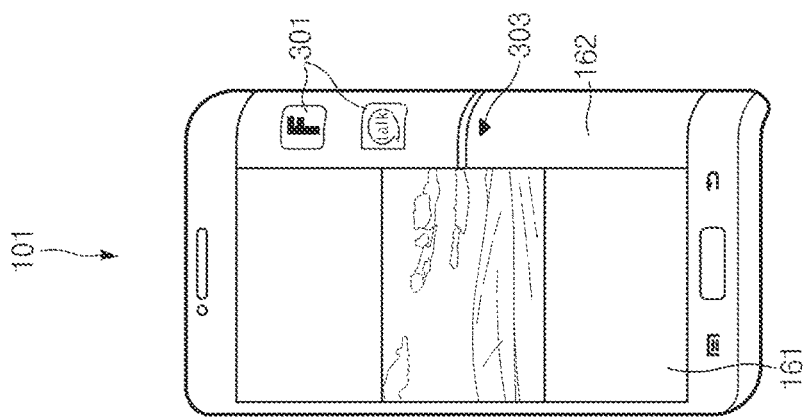
Figure 3A:
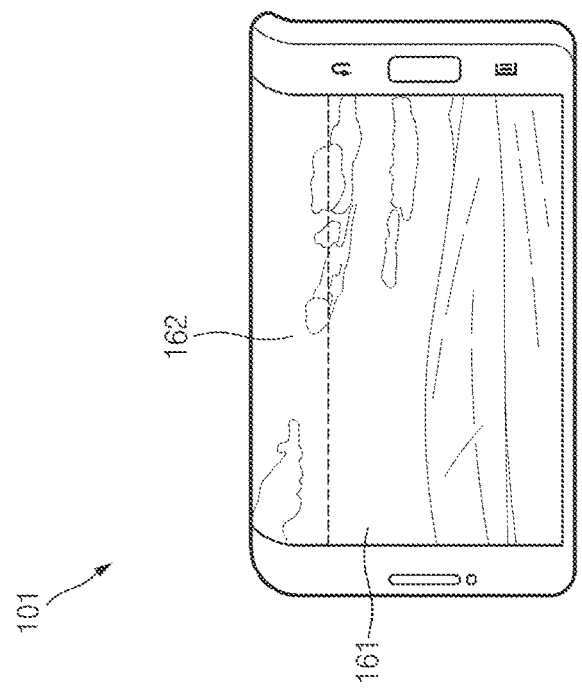

FIGS. 3A to 3C are screen views illustrating a display operating method during a camera operation according to an embodiment of the present disclosure.

Referring to FIGS. 1 and 3A to 3C, when a camera application is selected by a user, the electronic device 101 may output a preview image obtained through a camera (not shown) as shown in FIG. 3A. The preview image may be outputted to one of the first output area 161 and the second output area 162. When the display 160 is a flexible display, the electronic device 101 applies a bending area as the second output area 162 and the remaining area as the first output area 161. When the display 160 is not a flexible display, the electronic device 101 applies a predetermined area of the display 160 as the second output area 162 and the remaining area as the first output area 161.

It is confirmed that the electronic device 101 in a horizontal state (e.g., a landscape mode) as shown in FIG. 3A may rotate by a predetermined angle by a user and thus becomes a vertical state (e.g., a portrait mode) as shown in FIG. 3B. When the electronic device 101 rotates as shown in FIG. 3B, one preview image outputted in the first output area 161 and the second output area 162 may be converted to correspond to the rotation direction of the display 160 and then outputted. The electronic device 101 may rotate a preview image outputted to the display 160 as shown in FIG. 3A to correspond to the rotation direction of the display 160 and may convert the rotated preview image to be fit for the size of the first output area 161 to output the rotated preview image as shown in FIG. 3B.

When the second output area 162 rotates to be positioned at the right of the first output area 161 as shown in FIG. 3B, the electronic device 101 may arrange at least one item in the second output area 162 and may then output the at least one item. For example, at least one item may include an app icon and a symbol icon preset to be positioned in the second output area 162 each time a camera application is executed, an app icon and a symbol icon for sharing image data obtained from the camera application, an app icon and a symbol icon preset as a favorite, and an app icon for an application having the same profile as the camera application in execution.

When a virtual button 303 for item extension is selected as shown in FIG. 3B, the second output area 162 may output an item, that is, an attribute control icon 305, as shown in FIG. 3C. For example, the attribute control icon may include an icon for obtaining video, an icon for executing a reference point confirmation function in a preview image, and an icon for changing the color or color sense of the preview image. When another virtual button 307 for item extension is selected as shown in FIG. 3C, the electronic device 101 may output an item 301 again in the second output area 162 as shown in FIG. 3B.

According to an embodiment of the present disclosure, the electronic device 101 may confirm that as shown in FIGS. 3A to 3C, an item, that is, a progress display menu available for a zoom adjustment of a preview image, is not outputted in the first output area 161 or the second output area 162. In this state, the electronic device 101 may perform a zoom adjustment of a preview image by a signal inputted from a key (not shown) at the side or a touch signal inputted through the display 160.

The electronic device 101 may confirm that as shown in FIGS. 3A to 3C, an item, that is, a capturing icon for obtaining a preview image outputted to the display 160 as image data, is not outputted in the first output area 161 or the second output area 162. In this state, the electronic device 101 may obtain a preview image as image data by a signal inputted from a key (not shown) at the front or a touch signal inputted through the display 160.

FIGS. 4A to 4C are screen views illustrating a display operating method during a camera operation according to another embodiment of the present disclosure.

Referring to FIGS. 1 and 4A to 4C, when a camera application is selected by a user, the electronic device 101 may output a preview image obtained through a camera (not shown) in the first output area 161 as shown in FIG. 4A. The electronic device 101 may output an item, that is, a progress display menu 401 for performing a zoom adjustment of a preview image in a partial area of the first output area 161. The electronic device 101 may output an attribute control icon 305 relating to a camera application in execution. The attribute control icon 305 may include an icon for obtaining a preview image as image data and an icon for obtaining video data.

The electronic device 101 is in a horizontal state as shown in FIG. 4A and the second output area 162 is positioned on the first output area 161. It is detected that the electronic device 101 in the above state rotates by a predetermined angle, for example, as shown in FIG. 4B, a state in which the second output area 162 is positioned below the first output area 161. The electronic device 101 may rotate the preview image outputted in the first output area 161 in correspondence to the rotation direction of the display 160 and may then output the preview image in the first output area 161. The electronic device 101 may move an item, that is, the progress display menu 401 outputted in the first output area 161, to the second output area 162 and may then arrange the item. The electronic device 101 may move an item, that is, the attribute control icon 305 outputted in the second output area 162, to a partial area of the first output area 161 and may then arrange the item.

It is confirmed that the electronic device 101 rotates from a horizontal state as shown in FIG. 4A or 4B into a vertical state as shown in FIG. 4C. The electronic device 101 may convert the preview image outputted in the first output area 161 in correspondence to the rotation direction of the display 160 and may then output the preview image in the first output area 161. The electronic device 101 may change an item, that is, the attribute control icon 305 or the progress display menu 401 outputted in the second output area 162, into an item such as at least one icon 301 and may then output the item.

The electronic device 101 may confirm that a virtual button 303 for item extension is selected by a user in a state shown in FIG. 4C. Once the virtual button 303 is selected, the electronic device 101 may output the attribute control icon 305 relating to a camera application in the second output area 162 as shown in FIG. 3C. Although not shown in the drawings, the electronic device 101 may output an item, that is, the progress display menu 401, in a partial area of the first output area 161 where the preview image is outputted.

FIGS. 5A and 5B are screen views illustrating a display operating method when checking a webpage according to an embodiment of the present disclosure.

Referring to FIGS. 1, 5A, and 5B, the electronic device 101 may confirm that the address of a specific website is inputted in the second output area 162 by a user as shown in FIG. 5A. The electronic device 101 may output an execution screen corresponding to the website address in the first output area 161. The electronic device 101 may output a specific website address, that is, an item formed of text, in the second output area 162.

It is detected that the electronic device 101 in a horizontal state as shown in FIG. 5A may rotate by a predetermined angle by a user and thus becomes a vertical state as shown in FIG. 5B. The electronic device 101 may convert the execution screen outputted in the first output area 161 in correspondence to the rotation direction of the display 160 and may then output the execution screen. The electronic device 101 may move an item, that is, the text 501 outputted in the second output area 162, to the first output area 161 and may then arrange the item. The electronic device 101 may change the item, that is, the text 501 outputted in the second output area 162, into an item such as at least one icon 503 and may then output the item. While the current website is outputted in the first output area 161, at least one icon 503, for example, may include at least one of an app icon and a symbol icon preset to a favorite by a user.

In various embodiments, the electronic device 101 in a horizontal state as shown in FIG. 5A may display an execution screen of an application (e.g., internet browser). In this case, some part of the execution screen is displayed in the first output area 161 and the other part of the execution screen is displayed in the second output area 162. For example, the address bar of the internet browser is displayed in the second output area 162, and the content of the web-site is displayed in the first output area 161. If the device 101 rotates, as shown in FIG. 5B, the region for the address bar may be changed. Alternatively, in some embodiments, the region for the address bar may be fixed in the second output area 162. (and also the region for the contents of the web-site may be fixed in the first output area 161.) In other words, according to the application being executed or to the user settings, a portion of the execution screen may be fixed to one of the output area, and the portion may rotate in the fixed area.

The electronic device 101 may confirm that a virtual button 303 for item extension is selected by a user in a state shown in FIG. 5B. Once the virtual button 303 is selected, the electronic device 101 may output at least one icon in the second output area 162. For example, the icon may include at least one of an attribute control icon relating to an execution screen outputted in the first output area 161, an app icon relating to a pre-installed application, a symbol icon relating to a website, or a state icon relating to an indicator.

FIGS. 6A and 6B are screen views illustrating a display operating method when receiving a message according to an embodiment of the present disclosure.

Referring to FIGS. 1, 5A, 5B, 6A and 6B, the electronic device 101 may confirm that a new message is received through a chatting application while a function such as checking a website is in execution and a screen is outputted as shown in FIG. 5B. Once the new message is received, the electronic device 101 may additionally output an icon 301 relating to a chatting application in the second output area 162 as shown in FIG. 6A. The electronic device 101 may confirm that a virtual button 303 for item extension is selected by a user in a state shown in FIG. 6A. Once the virtual button 303 is selected, the electronic device 101 may output at least one icon in the second output area 162. For example, the icon may include at least one of an attribute control icon relating to an execution screen outputted in the first output area 161, an app icon relating to a pre-installed application, a symbol icon relating to a website, or a state icon relating to an indicator.

It is detected that the electronic device 101 in a vertical state as shown in FIG. 6A may rotate by a predetermined angle by a user and thus becomes a horizontal state as shown in FIG. 6B. The electronic device 101 may convert the execution screen outputted in the first output area 161 in correspondence to the rotation direction of the display 160 and may then output the execution screen. The electronic device 101 may change the items 301 and 503 outputted in the second output area 162 into an item, that is, a new message configured with a text and may then output the items.

It is confirmed that a threshold time elapses after the electronic device 101 outputs the new message 502 in the second output area 162 in a horizontally rotated state. When the threshold time elapses, the electronic device 101 may delete the new message 502 in the second output area 162. The electronic device 101 may change the new message 502 into a website address 501 configured with a text like the second output area 162 of FIG. 5A and may then output the website address.

Figure 7B:
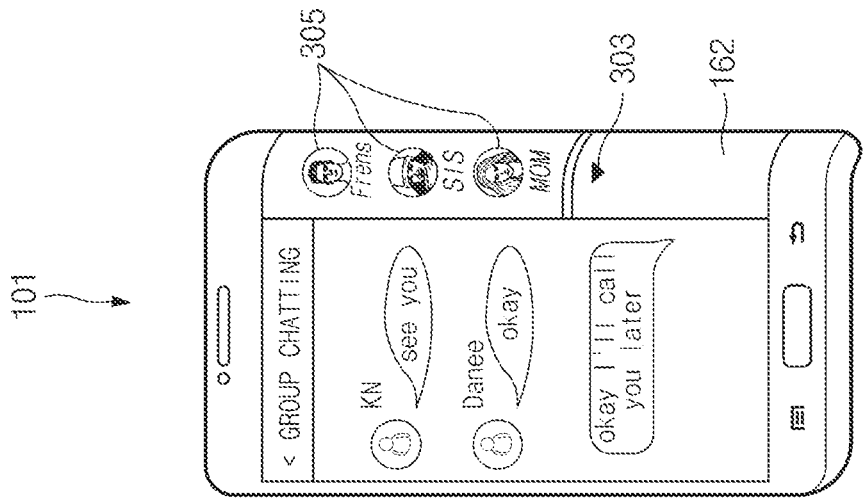
FIGS. 7A and 7B are screen views illustrating a display operating method when executing a chatting application according to an embodiment of the present disclosure.
Figure 7A:
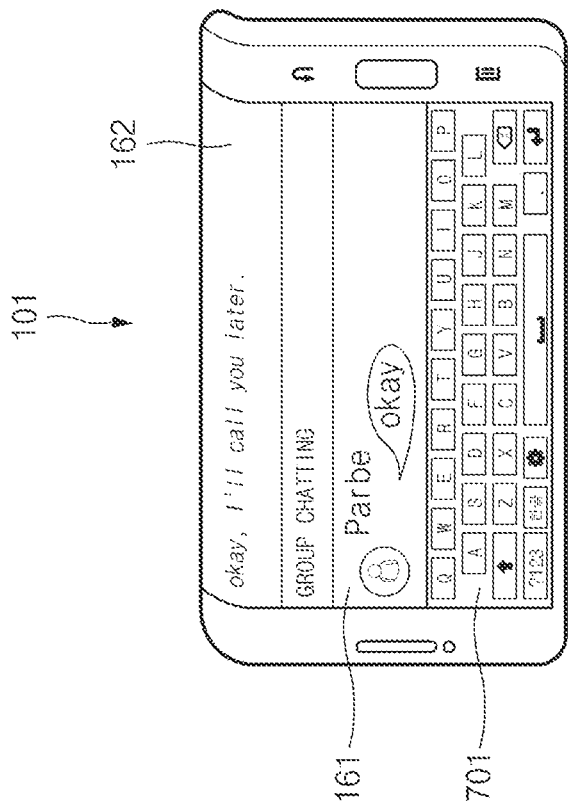

FIGS. 7A and 7B are screen views illustrating a display operating method when executing a chatting application according to an embodiment of the present disclosure.

Referring to FIGS. 1, 6A, 6B, 7A, and 7B, the electronic device 101 may receive a new message 502 through a chatting application as shown in FIG. 6B while executing a function such as checking a website. The electronic device 101 may receive a selection signal of the new message 502 from a user while the chatting application is outputted in the second output area 162. The electronic device 101 may display the execution screen of the chatting application in the first output area 161 according to a selection signal as shown in FIG. 7A. The electronic device 101 may display a keyboard image 701 in the first output area 161 and may output a text inputted through the keyboard image 701 in the second output area 162.

It is detected that the electronic device 101 in a horizontal state as shown in FIG. 7A may rotate by a predetermined angle by a user and thus becomes a vertical state as shown in FIG. 7B. The electronic device 101 may convert the execution screen of the chatting application displayed in the first output area 161 in correspondence to the rotation direction of the display 160 and may then output the execution screen. The electronic device 101 may display an attribute control icon 305 relating to the chatting application in the second output area 162. The attribute control icon 305 relating to the chatting application may be a list of at least one chatting room generated in the chatting application.

The electronic device 101 may confirm that a virtual button 303 for item extension is selected by a user as shown in FIG. 7B. Once the virtual button 303 is selected, the electronic device 101 may output at least one item in the second output area 162. For example, the icon may include an app icon relating to an application pre-installed on the electronic device 101, a symbol icon relating to a website, or a state icon relating to an indicator.

Figure 8B:
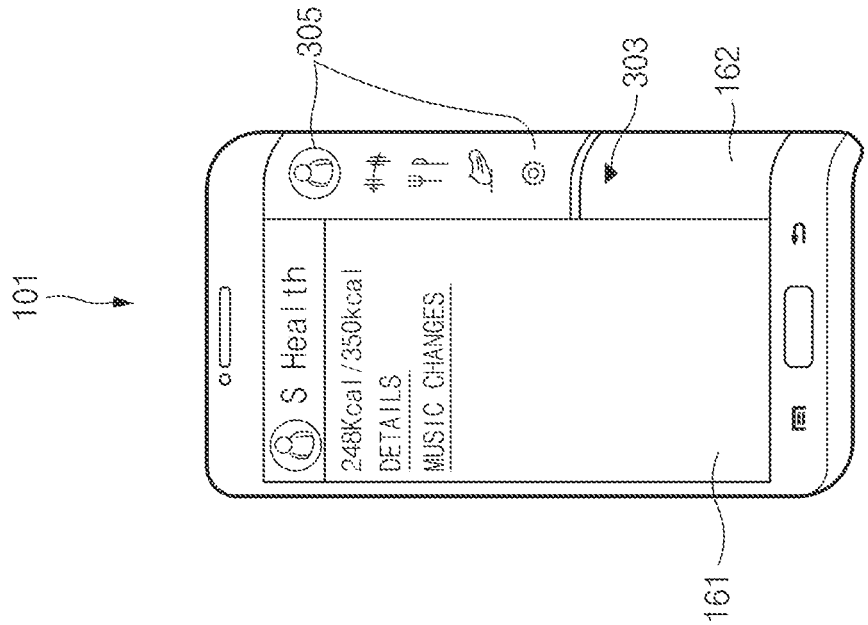
FIGS. 8A and 8B are screen views illustrating a display operating method when executing a health application according to an embodiment of the present disclosure.
Figure 8A:
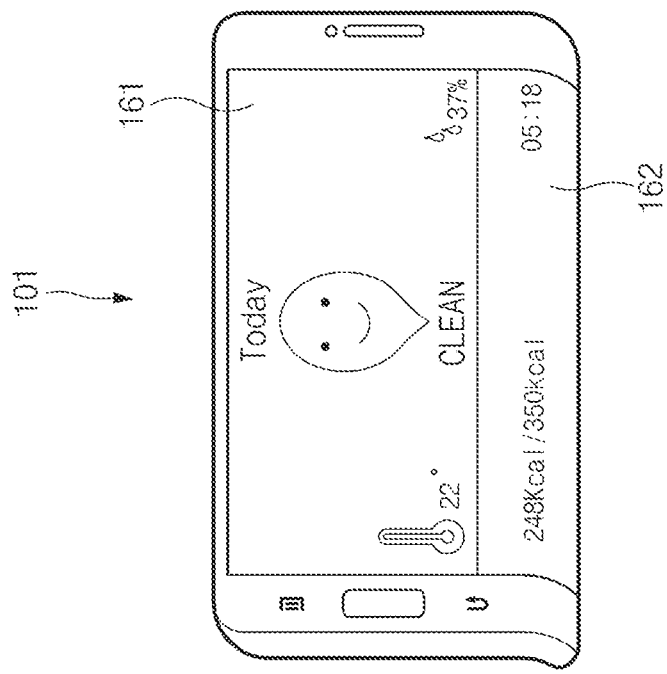

FIGS. 8A and 8B are screen views illustrating a display operating method when executing a health application according to an embodiment of the present disclosure.

Referring to FIGS. 1, 8A, and 8B, when a user executes a health application, the electronic device 101 may output information such as today's atmosphere state, temperature, and humidity in the first output area 161 as shown in FIG. 8A. The electronic device 101 may output an item in text form, for example, user's burned calories or target calories in the second output area 162.

It is detected that the electronic device 101 in a horizontal state as shown in FIG. 8A may rotate by a predetermined angle by a user and thus becomes a vertical state as shown in FIG. 8B. The electronic device 101 may move an item, that is, a text outputted in the second output area 162, to a partial area of the first output area 161 and may then arrange the item. The electronic device 101 may change an execution screen outputted in the first output area 161 before the display 160 rotates into a new execution screen and may then output the execution screen. Once it is confirmed that the electronic device 101 rotates from FIG. 8A to 8B, the electronic device 101 may change a text item outputted in the second output area 162 into an attribute control icon 305 relating to the health application in execution.

The electronic device 101 may confirm that a virtual button 303 for item extension is selected by a user as shown in FIG. 8B. Once the virtual button 303 is selected, the electronic device 101 may output at least one item in the second output area 162. For example, the icon may include an app icon relating to an application pre-installed on the electronic device 101, a symbol icon relating to a website, or a state icon relating to an indicator.

Figure 9:
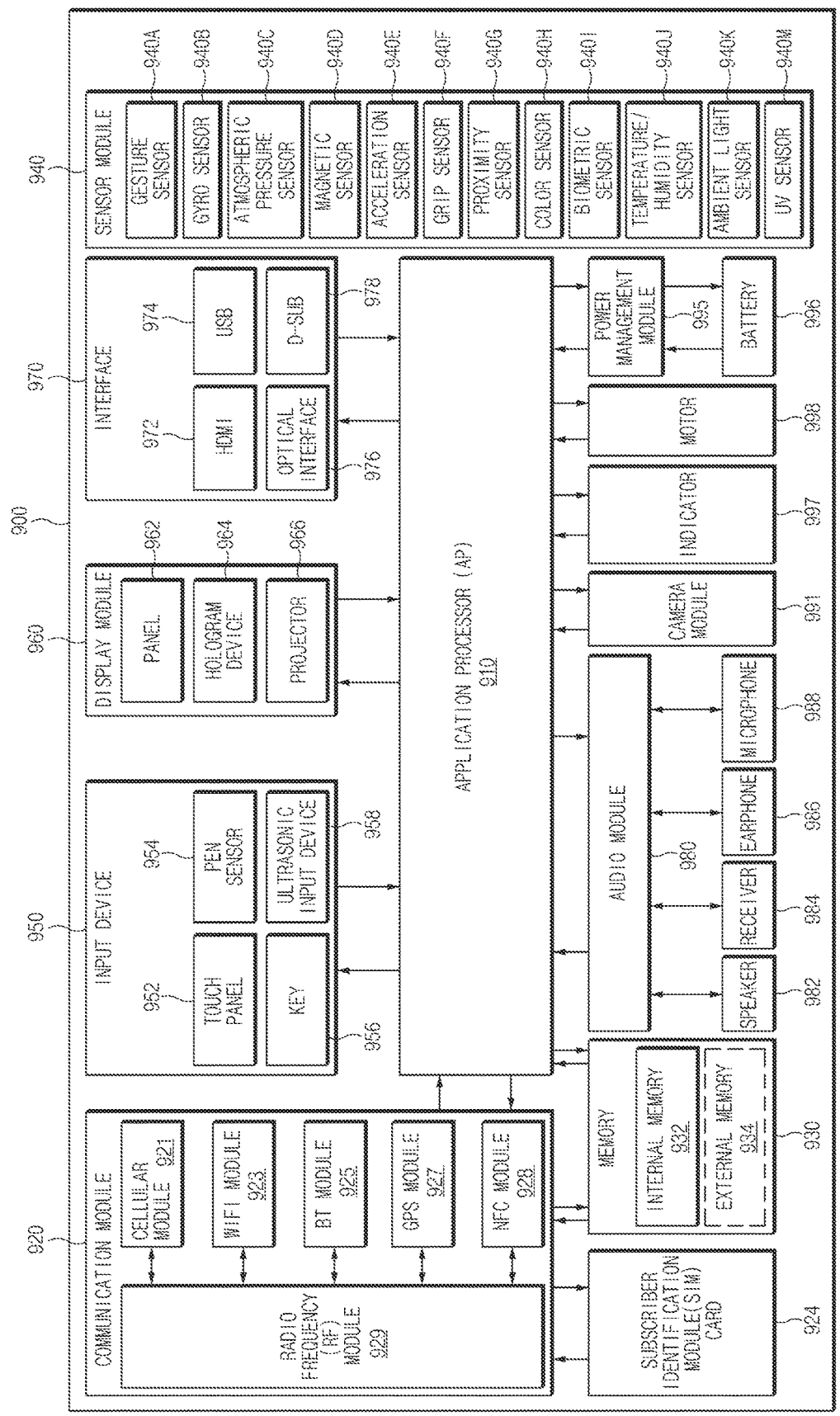
FIG. 9 is a block diagram illustrating an electronic device according to various embodiments of the present disclosure.

FIG. 9 is a block diagram illustrating an electronic device according to various embodiments of the present disclosure.

Referring to FIG. 9, the electronic device 900, for example, may configure all or part of the above-mentioned electronic device 101 shown in FIG. 1. The electronic device 900 includes at least one Application Processor (AP) 910, a communication module 920, a Subscriber Identification Module (SIM) card 924, a memory 930, a sensor module 940, an input device 950, a display 960, an interface 970, an audio module 980, a camera module 991, a power management module 995, a battery 996, an indicator 997, and a motor 998.

The AP 910, for example, the processor 120 (and/or the operation management module 180) shown in FIG. 1, may control a plurality of hardware or software components connected to the AP 910 by executing an operating system or an application program and may perform various data processing and operations with multimedia data. The AP 910 may be implemented with a System on Chip (SoC), for example. According to an embodiment of the present disclosure, the AP 910 may further include a Graphic Processing Unit (GPU) (not shown).

The AP 910 may perform a function of the operation management module 180 shown in FIG. 1, for example. The AP 910 may output an execution screen in the first output area of the display 960 and may output at least one item in the second output area. When the rotation detection of the display 960 is confirmed by the sensor module 940, the AP 910 may change an item outputted in the second output area and may then output the item.

The communication module 920, for example, the communication interface 170 shown in FIG. 1, may perform data transmission in a communication between the electronic device 900 (e.g., the electronic device 101) and other electronic devices connected via a network. According to an embodiment of the present disclosure, the communication module 920 may include a cellular module 921, a Wi-Fi module 923, a BT module 925, a GPS module 927, an NFC module 928, and a Radio Frequency (RF) module 929.

According to an embodiment of the present disclosure, the AP 910 or the cellular module 921 (e.g., a CP) may load instructions or data, which are received from a nonvolatile memory or at least one of other components connected thereto, into a volatile memory and then may process them. Furthermore, the AP 910 or the cellular module 921 may store data received from or generated by at least one of other components in a nonvolatile memory.

Each of the Wi-Fi module 923, the BT module 925, the GPS module 927, and the NFC module 928 may include a processor for processing data transmitted/received through a corresponding module. Although the cellular module 921, the Wi-Fi module 923, the BT module 925, the GPS module 927, and the NFC module 928 are shown as separate blocks in FIG. 9, according to an embodiment of the present disclosure, some (e.g., at least two) of the cellular module 921, the Wi-Fi module 923, the BT module 925, the GPS module 927, and the NFC module 928 may be included in one Integrated Chip (IC) or an IC package. For example, at least some (e.g., a CP corresponding to the cellular module 921 and a Wi-Fi processor corresponding to the Wi-Fi module 923) of the cellular module 925, the Wi-Fi module 927, the BT module 928, the GPS module 921, and the NFC module 923 may be implemented with one SoC.

The SIM card 924 may be a card including a subscriber identification module and may be inserted into a slot formed at a specific position of an electronic device. The SIM card 924 may include unique identification information (e.g., an Integrated Circuit Card IDentifier (ICCID)) or subscriber information (e.g., an International Mobile Subscriber Identity (IMSI)).

The memory 930, for example, the memory 130 of FIG. 1, may include an internal memory 932 or an external memory 934. The internal memory 932 may include at least one of a volatile memory (e.g., Dynamic RAM (DRAM), Static RAM (SRAM), Synchronous Dynamic RAM (SDRAM)) and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory) The memory 930 may store an application received from an external device and installed and may store an app icon of the application.

The sensor module 940, for example, the sensor module 140 of FIG. 1, measures physical quantities or detects an operating state of the electronic device 900, thereby converting the measured or detected information into electrical signals. The sensor module 940 may include at least one of a gesture sensor 940A, a gyro sensor 940B, a pressure sensor 940C, a magnetic sensor 940D, an acceleration sensor 940E, a grip sensor 940F, a proximity sensor 940G, a color sensor 940H (e.g., a Red, Green, Blue (RGB) sensor), a bio sensor 940I, a temperature/humidity sensor 940J, an illumination sensor 940K, and an Ultra Violet (UV) sensor 940M. The sensor module 940 may detect whether the electronic device 900 rotates by using the gyro sensor 940B and may convert this information into electrical signals to provide them to the AP 910.

The input device 950, may include a touch panel 952, a (digital) pen sensor 954, a key 956, or an ultrasonic input device 958. The touch panel 952 (e.g., the output module 130) may recognize a touch input through at least one of capacitive, resistive, infrared, or ultrasonic methods, for example. Additionally, the touch panel 952 may further include a control circuit. In the case of the capacitive method, both direct touch and proximity recognition are possible. The touch panel 952 may further include a tactile layer. In this case, the touch panel 952 may provide a tactile response to a user.

The (digital) pen sensor 954 may be implemented through a method similar or identical to that of receiving a user's touch input or an additional sheet for recognition. The key 956 (e.g., the input module 120) may include a physical button, a touch key, an optical key, or a keypad, for example. The ultrasonic input device 958, as a device checking data by detecting sound waves through a mike (e.g., a mike) in the electronic device 900, may provide wireless recognition through an input tool generating ultrasonic signals. According to an embodiment of the present disclosure, the electronic device 900 may receive a user input from an external device (e.g., a computer or a server) connected to the electronic device 900 through the communication module 920.

The display 960, for example, the display 160 of FIG. 1, may include a panel 962, a hologram device 964, or a projector 966. The panel 962, for example, may include a Liquid-Crystal Display (LCD) or an Active-Matrix Organic Light-Emitting Diode (AM-OLED). The panel 962 may be implemented to be flexible, transparent, or wearable, for example. The panel 962 and the touch panel 952 may be configured with one module. The display 960 may output an execution screen for a function in execution in the first output area and may output an item such as an icon, a menu, or a text in the second output area according to a control of the AP 910. At this point, an icon among items may be an attribute control icon relating to a specific function providing an execution screen, an app icon relating to an application, a symbol icon relating to a website, or a state icon relating to an indicator. A menu among items may be a progress display menu performing a zoom adjustment of image data or a volume adjustment of sound data, and a text may include a notification message for an operation of a pre-installed application or a web URL address.

The interface 970 may include a HDMI 972, a USB 974, an optical interface 976, or a D-subminiature (sub) 978, for example. Additionally/alternately, the interface 970 may include a Mobile High-definition Link (MHL) interface, a SD card/Multi-Media Card (MMC) interface, or an Infrared Data Association (IrDA) standard interface.

The audio module 980 may convert sound and electrical signals in both directions. The audio module 980 may process sound information inputted or outputted through a speaker 982, a receiver 984, an earphone 986, or a microphone 988, for example.

The camera module 991, as a device for capturing a still image and a video, may include at least one image sensor (e.g., a front sensor or a rear sensor), a lens (not shown), an Image Signal Processor (ISP) (not shown), or a flash (not shown) (e.g., an LED or a xenon lamp).

The power management module 995 may manage the power of the electronic device 900. Although not shown in the drawings, the power management module 995 may include a Power Management Integrated Circuit (PMIC), a charger Integrated Circuit (IC), or a battery or fuel gauge, for example.

A battery gauge may measure the remaining amount of the battery 996, or a voltage, current, or temperature thereof during charging. The battery 996 may store or generate electricity and may supply power to the electronic device 900 by using the stored or generated electricity. The battery 996, for example, may include a rechargeable battery or a solar battery.

The indicator 997 may display a specific state of the electronic device 900 or part thereof (e.g., the AP 910), for example, a booting state, a message state, or a charging state. The motor 998 may convert electrical signals into mechanical vibration. Although not shown in the drawings, the electronic device 900 may include a processing device (e.g., a GPU) for mobile TV support. A processing device for mobile TV support may process media data according to the standards such as Digital Multimedia Broadcasting (DMB), Digital Video Broadcasting (DVB), or media flow.

As mentioned above, according to various embodiments of the present disclosure, a display operating electronic device and method divide a display into a plurality of displays and output various menus in a predetermined area of the divided displays, so that confusion on the manipulation of a user's electronic device may be minimized.

According to various embodiments of the present disclosure, a display operating electronic device and method divide one display equipped in an electronic device into a plurality of output areas and control an output of a first output area and a second output area according to a rotation of the display, so that a user interface optimized for the rotation of an electronic device may be provided.

Each of the above-mentioned components of an electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some of components in an electronic device according to an embodiment of the present disclosure are configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof "module" may be implemented mechanically or electronically. For example, "module" according to various embodiments of the present disclosure may include at least one of an Application-Specific Integrated Circuit (ASIC) chip performing certain operations, Field-Programmable Gate Arrays (FPGAs), or a programmable-logic device, all of which are known or to be developed in the future.

According to various embodiments, at least part of a device (e.g., modules or functions thereof) or a method (e.g., operations) according to this disclosure, for example, as in a form of a programming module, may be implemented using an instruction stored in computer-readable storage media. When an instruction is executed by at least one processor, the at least one processor may perform a function corresponding to the instruction. The computer-readable storage media may include a memory for example. At least part of a programming module may be implemented (e.g., executed) by a processor, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (e.g., a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of this disclosure and vice versa.

Additionally, a programming module may include at least one of the above-mentioned components or additional other components. Or, part of the programming module may be omitted. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While, the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display operating electronic device, the display operating electronic device comprising:
a display configured to include a flat output area and a curved output area;
a sensor configured to detect whether the display rotates; and
at least one processor configured to:
output an execution screen in the flat output area and output at least one item in the curved output area, and replace the at least one item in the curved output area with at least one new item in the curved output area if a pre-defined amount of rotation is detected,
wherein the at least one item and the at least one new item are determined based upon an association between an application executing to output in the execution screen and a direction in which the curved output area faces, and
wherein the at least one processor is further configured to:
receive a text message associated with a chatting application when the display is in a vertical state,
output an icon related to the chatting application, and
output, when it is confirmed that the display rotates from the vertical state to a horizontally rotated state, the text message in a second output area.

2. The device according to claim 1, wherein, when it is confirmed that the display rotates, the at least one processor is further configured to:
rotate the execution screen according to a rotation direction of the display, and output the rotated execution screen in the flat output area.

3. The device according to claim 1, wherein, when it is confirmed that the display rotates, the at least one processor is further configured to arrange the at least one item outputted in the curved output area in the flat output area.

4. The device according to claim 1, wherein the at least one processor is further configured to output the execution screen and at least one item in the flat output area.

5. The device according to claim 4, wherein, when it is confirmed that the display rotates, the at least one processor is further configured to interchange and arrange the at least one item outputted in the flat output area and the at least one item outputted in the curved output area.

6. The device according to claim 1, wherein the at least one item comprises at least one of an icon, a menu, or a text.

7. The device according to claim 1, wherein the at least one item comprises at least one of an attribute control icon relating to a specific function providing the execution screen, an app icon relating to the application, a symbol icon relating to a website, and a state icon relating to an indicator.

8. The device according to claim 1, wherein the at least one item is a progress display menu for a zoom adjustment of image data or a volume adjustment of sound data.

9. The device according to claim 1, wherein the at least one item is a text including a notification message for an operation of a pre-installed application or a web URL address.

10. A display operating method, the display operating method comprising:
outputting an execution screen in a flat output area of a display;
outputting at least one item in a curved output area; and
outputting, when it is confirmed that the display rotates, at least one new item in the curved output area,
wherein the at least one item and the at least one new item are determined based upon an association between an application executing to output in the execution screen and a direction in which the curved output area faces, and
wherein the method further comprises:
receiving a text message associated with a chatting application when the display is in a vertical state;
outputting an icon related to the chatting application; and
outputting, when it is confirmed that the display rotates from the vertical state to a horizontally rotated state, the text message in a second output area.

11. The method according to claim 10, wherein the outputting of the at least one new item in the curved output area further comprises rotating, when it is confirmed that the display rotates, the execution screen according to a rotation direction of the display and outputting the rotated execution screen in the flat output area.

12. The method according to claim 10, wherein the outputting of the at least one new item in the curved output area further comprises arranging, when it is confirmed that the display rotates, the at least one item outputted in the curved output area in the flat output area.

13. The method according to claim 10, wherein the outputting of the execution screen in the flat output area of the display and the outputting of the at least one item in the curved output area further comprise outputting the execution screen and at least one item in the flat output area and outputting at least one item in the curved output area.

14. The method according to claim 13, wherein the outputting of the at least one new item in the curved output area further comprises interchanging and outputting, when it is confirmed that the display rotates, the at least one item outputted in the flat output area and the at least one item outputted in the curved output area.

15. An electronic device, the electronic device comprising:
a display configured to include a flat area and a curved sub-area, one side of the flat area meeting one side of the curved sub-area;
a sensor configured to detect a rotation angle of the device; and
at least one processor configured to:
output a main screen to the flat area and a sub-screen to the curved sub-area, and
change the sub-screen to display at least one new item based on the rotation angle of the electronic device,
wherein the at least one item and the at least one new item are determined based upon an association between an application executing to output in an execution screen and a direction in which the curved output area faces, and
wherein the at least one processor is further configured to:
receive a text message associated with a chatting application when the display is in a vertical state,
output an icon related to the chatting application, and
output, when it is confirmed that the display rotates from the vertical state to a horizontally rotated state, the text message in a second output area.

16. The device according to claim 15, wherein the sub-screen includes at least one item, the at least one item being determined based on both a content of the main screen and the rotation angle of the electronic device.

17. The device according to claim 16, wherein the at least one processor is further configured to:
execute the application, and output a content of the application as the content of the main screen to the flat area and a menu related to the application as the at least one item to the curved sub-area.

18. The device according to claim 15, wherein the sub-screen includes at least one item which is fixed regardless of the application executed by the at least one processor.

* * * * *